E. A. McKOY AND G. D. MOORE.
DISINTEGRATING AND CONSERVING MECHANISM.
APPLICATION FILED MAY 20, 1921.
Reissued July 26, 1921. 15,165.
2 SHEETS—SHEET 1.
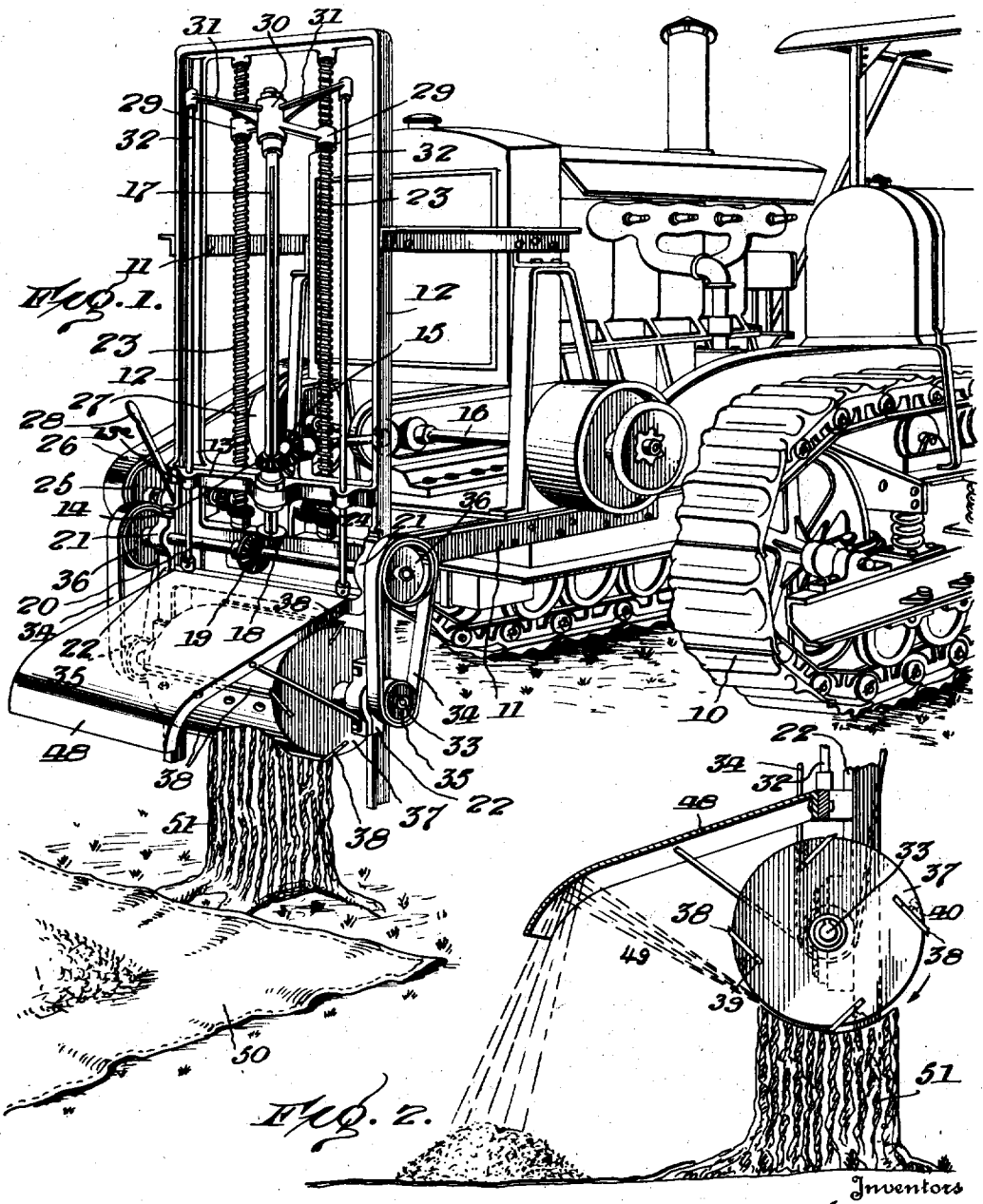
Inventors
Edwin A. McKoy
and George D. Moore,
By Prentiss, Stone & Boyden,
Attorneys E. A. McKOY AND G. D. MOORE.

DISINTEGRATING AND CONSERVING MECHANISM.

APPLICATION FILED MAY 20, 1921.

Reissued July 26, 1921. 15,165.

2 SHEETS—SHEET 2.

Inventors
Edwin A. McKoy
and George D. Moore,
By Prentiss, Stone & Boyden,
Attorneys

UNITED STATES PATENT OFFICE.

EDWIN A. McKOY AND GEORGE D. MOORE, OF NEW ORLEANS, LOUISIANA.

DISINTEGRATING AND CONSERVING MECHANISM.

15,165. Specification of Reissued Letters Patent. Reissued July 26, 1921.

Original No. 1,312,450, dated August 5, 1919, Serial No. 202,539, filed November 17, 1917. Application for reissue filed May 20, 1921. Serial No. 471,258.

*To all whom it may concern:*

Be it known that we, EDWIN A. McKOY and GEORGE D. MOORE, citizens of the United States of America, and residents of New Orleans, in the parish of Orleans and State of Louisiana, have invented certain new and useful Improvements in Disintegrating and Conserving Mechanism, of which the following is a specification.

This invention relates to disintegrating and conserving mechanism especially adapted for disintegrating the material of standing stumps and conserving the valuable material thus disintegrated for further use.

The general object of the invention is to provide an improved cutter device mounted upon a self-propelled dirigible vehicle, adapted to move the cutter from place to place to operate upon standing stumps, and carrying a power plant for actuating the cutter.

A further object of the invention is to provide a cutter-head of a type generically rotated upon a horizontal axis and specifically embodying different forms of peripheral surfaces.

A further object of the invention is to provide in such a stump disintegrating mechanism, a cutter rotating upon a horizontal axis, carrying knives adapted, when the cutter is rotated, to throw the disintegrated material tangentially from the cutter, with a baffle properly positioned to intercept the tangentially discharged material and guide it to a suitable receptacle.

With these and other objects in view the invention comprises certain novel constructions, combinations and arrangement of parts as will be hereinafter more fully described and claimed.

In the drawing, Figure 1 is a perspective view of one type of cutter mounted upon a dirigible power plant of the usual and ordinary caterpillar type.

Fig. 2 is a diagrammatic end view of the cutter and baffle showing the manner of tangential discharge from the cutter to baffle and from the baffle to a receptacle.

Like characters of reference designate corresponding parts throughout the several views.

Figure 3:
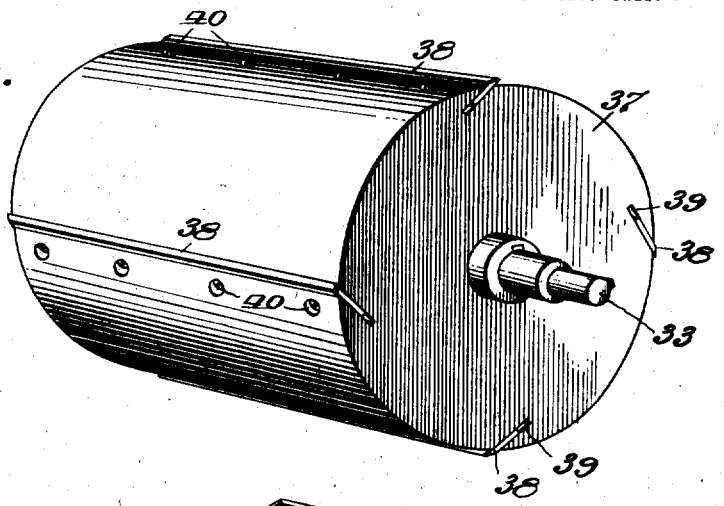
Figs. 3, 4 and 5 are, respectively, perspective views of modifications of the cutter.

The general type of machine which forms the subject matter of this application is similar to the machine disclosed in Patent Number 1,313,708, dated August 19, 1919, and the present invention differs from said patent chiefly as regards the construction of the cutter device, and the driving mechanism therefor.

The dirigible power plant of the caterpillar type is shown conventionally at 10 to which a framework 11 is secured, carrying an upright frame 12. The frame 12 is provided with a cross bar 13, forming a bearing for a beveled pinion 14, intermeshing with a beveled gear 15, driven from the power shaft 16 of the power plant. A shaft 17 is splined within the beveled pinion 14, permitting such shaft vertical longitudinal sliding movement independently of such beveled pinion 14, but rotated thereby and therefrom. The shaft 17 carries upon its lower end a beveled gear 18 intermeshing with a pinion 19 carried upon a transverse shaft 20, which is journaled in bearings 21, carried upon an auxiliary frame 22, slidable upon the frame 12. The power from the power shaft 16 is therefore transmitted to the transverse shaft 20 irrespective of the vertical position of such shaft relative to the frame 12. The vertical movement of the auxiliary frame 22 and shaft 17 is accomplished mechanically in any approved manner, as by a pair of vertical feed worms 23, journaled in the frame 12 and driven by gearing 24 and pulley 25, by means of a belt 26, from a pulley 27 upon the power shaft 16. Any usual and ordinary type of reverse mechanism is employed for rotating the feed worms 23 in either direction to produce an upward or downward movement of the auxiliary frame 22, the control lever for such reversing mechanism being indicated at 28.

To transmit movement from the feed worms 23 to the auxiliary frame 22, nuts 29 are mounted upon such feed worms, such nuts carrying a thrust bearing 30, journaling the upper end of the slidable shaft 17, and also carrying arms 31 which are attached to rods 32 which in turn are rigidly connected at their lower ends with the auxiliary frame 22, whereby, when the nuts are moved upon the feed worms, the movement is transmitted to the auxiliary frame and shaft 17 to either raise or lower such parts as circumstances may require. The rods 32 slide freely through guides 13[a], carried by the cross bar 13.

Journaled also upon the auxiliary frame 22 is a shaft 33 driven from the transverse shaft 20 by one or more belts 34, passing over pulleys 35 secured upon the shaft 33 and other pulleys 36 upon the transverse shaft 20.

The shaft 33 carries a cutter, which, specifically may be of varying profiles. As shown in Figs. 1, 2 and 3, the cutter is in the form of a cylindrical drum 37 having knives 38 extending longitudinally of the drum, and set into slots 39 positioned as partial cords of minor arcs of the peripheral circle. The knives are mounted in operative position with their cutting edges extended slightly beyond the periphery of the cylinder, and are secured in position in any approved manner, as by the bolts 40.

Figure 4:
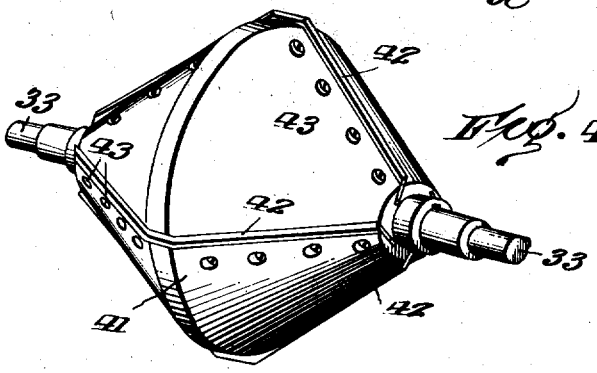

Instead of making the cutter as a cylinder it may be made, as shown at 41 in Fig. 4, in the form of two truncated cones, set base to base with their axes coinciding. Knives 42 are similarly employed, the cutting edges corresponding to the profile of the cutter, and as in the type shown in Fig. 3, extending slightly beyond the peripheral surface of the cutter body. These knives are also maintained in operative position in any approved manner, as by the employment of bolts 43.

Figure 5:
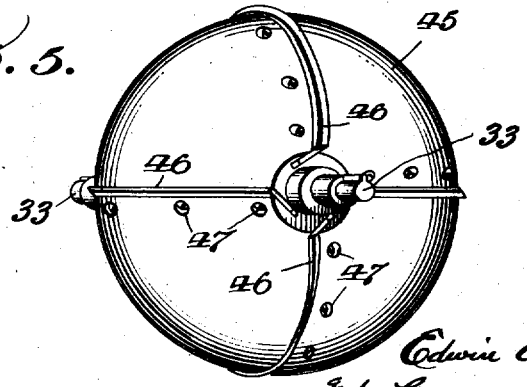

Another modification of the cutter is shown at 45 in Fig. 5, and is substantially spherical or spheroidal in shape, having the knives 46 each formed substantially as half an annulus, secured within the slots in the cutter by means of bolts 47.

Whatever the profile of the cutter, it is in the nature of a solid of revolution, journaled axially upon the horizontal shaft 33, and driven through the transmission mechanism previously described, from the dirigible power plant. Carried also upon the auxiliary frame 22 is a baffle plate 48, properly positioned so that the cuttings, which are thrown tangentially from the cutter, as indicated at 49, impinge against the under surface of the inclined baffle and are thereby deflected to any properly positioned receptacle, as the sheet 50, placed upon the ground adjacent the stump.

In operation, the machine will be moved about over the ground, as desired, by its own power, and when properly positioned relative to a stump to be cut, the cutter will be lowered into engagement with the stump, by actuating the feed worms 23, while at the same time it is continuously rotated by the power plant. The direction of rotation is as indicated by the arrow in Fig. 2, thus cutting the material of the stump, indicated at 51, and throwing the chips against the hood or baffle 48. The operation is similar to that of a planer head, except that the cut is made substantially across the grain of the stump. The cutting will be continued by the auxiliary frame and the cutter being fed downwardly through the driving of the feed worms 23 until the entire material of the stump above the ground has been disintegrated and deposited, as described, and if the cutter heads, as shown in Figs. 4 and 5, are employed, the cutting may be continued even below the surface of the ground.

It will be particularly noted that the maximum diameter and axial length of the cutter will usually be at least equal to and preferably greater than the diameter or transverse section of the stump being cut, where the stump is not of excessive size, so that the supporting structure, having been once properly positioned, can remain stationary during the entire cutting operation, the only movement necessary being the downward feeding of the cutter. In this respect, the present improved machine differs fundamentally from prior machines of the planer type, in the operation of which it is necessary to cause the machine to travel continuously over the work.

We claim:

1. A machine for removing stumps and conserving the substance thereof, comprising a portable frame having means for supporting, rotating and downwardly feeding toward the stump a horizontal shaft, a cutter whose diametrical and longitudinal dimensions are substantially equal to, or greater than, the transverse section of the stump, and a hood movable with said cutter and arranged to deflect and gather the cuttings.

2. A machine for removing stumps and conserving the substance thereof, comprising a portable frame having means for supporting, rotating and downwardly feeding toward the stump a horizontal shaft, a cutter whose axial extent and some of whose diametrical planes are substantially equal to, or greater than, the transverse section of the stump, and a hood movable with said cutter and arranged to deflect and gather the cuttings.

3. A machine for removing stumps and conserving the substance thereof, comprising a portable frame having means for supporting, rotating and downwardly feeding toward the stump a horizontal shaft, a cutter whose greatest diameter and longitudinal dimensions are substantially equal to, or greater than, the transverse section of the stump, and a hood movable with the cutter and arranged to deflect and gather the cuttings.

4. A machine for removing stumps and conserving the substance thereof, comprising a portable frame having means for supporting, rotating and downwardly feeding toward the stump a horizontal shaft, a cutter whose diametrical and longitudinal dimensions approximate the transverse section of the stump, and a hood movable with said cutter and arranged to deflect and gather the cuttings.

5. A machine for removing stumps and conserving the substance thereof, comprising a portable frame having means for supporting, rotating and downwardly feeding toward the stump a horizontal shaft, a cutter whose greatest diameter and longitudinal dimensions approximate the transverse section of the stump and a hood movable with said cutter and arranged to deflect and gather the cuttings.

6. A machine for removing stumps and conserving the substance thereof, comprising a portable structure, a horizontal shaft journaled therein, means carried by said structure for rotating said shaft and feeding the same toward the stump to be removed, a cutter carried by said shaft, the diametrical and longitudinal dimensions of which cutter are substantially equal to, or greater than, the transverse section of the stump, and a hood movable with said cutter and arranged to deflect and gather the cuttings.

7. A machine for removing stumps and conserving the substance thereof, comprising a portable structure, a horizontal shaft journaled therein, means carried by said structure for rotating and downwardly feeding said shaft toward the stump to be removed, a cutter in the form of a solid of revolution carried by said shaft, the axial extent and maximum diameter of which cutter are substantially equal to, or greater than, the transverse section of the stump, and a hood movable with said cutter and arranged to deflect and gather the cuttings.

8. A machine for removing stumps and conserving the substance thereof, comprising a portable structure, a horizontal shaft journaled therein, means carried by said structure for rotating and downwardly feeding said shaft toward the stump to be removed, a cutter whose greatest diameter and axial dimensions are each substantially equal to, or greater than, the diameter of the stump, said cutter being carried by said shaft, and a hood movable with the cutter and arranged to deflect and gather the cuttings.

9. A machine for removing stumps and conserving the substance thereof, comprising a portable structure, a horizontal shaft journaled therein, means carried by said structure for rotating and downwardly feeding said shaft toward the stump to be removed, a cutter carried by said shaft, the diametrical and axial dimensions of which cutter approximate the transverse section of the stump, and a hood movable with said cutter and arranged to deflect and gather the cuttings.

10. A machine for removing stumps and conserving the substance thereof, comprising a portable structure, a horizontal shaft journaled therein, means carried by said structure for rotating and downwardly feeding said shaft toward the stump to be removed, a cutter carried by said shaft, the greatest diameter and longitudinal dimensions of which cutter approximate the transverse section of the stump, and a hood movable with said cutter and arranged to deflect and gather the cuttings.

11. A machine for removing stumps and conserving the substance thereof, comprising a horizontal shaft, a portable structure having means for supporting, rotating, and downwardly feeding said shaft toward the stump to be removed, a cutter in the form of a solid of revolution rigidly carried by said shaft, and a hood movable with said cutter, and arranged to deflect and gather the cuttings.

12. A machine for removing stumps and conserving the substance thereof, comprising a cutter, means to support and rotate said cutter about a horizontal axis, means to transport the cutter, while idle, from place to place in a substantially horizontal path, and means to raise and lower the cutter, while active, and retained against horizontal movement.

In testimony whereof we affix our signatures.

EDWIN A. McKOY.
GEORGE D. MOORE.